March 25, 1924.                                                1,488,183
C. R. WILSON ET AL
TOP SCREW CAM FOR GILL DRAWING FRAMES
Filed May 7, 1923

Inventors.
Charles R. Wilson
Charles F. Scott
By Southgate & Southgate
Attorneys.

Patented Mar. 25, 1924.

1,488,183

UNITED STATES PATENT OFFICE.

CHARLES R. WILSON, OF PROVIDENCE, RHODE ISLAND, AND CHARLES R. SCOTT, OF WESTBORO, MASSACHUSETTS, ASSIGNORS TO GILL SCREW ASSOCIATES, OF WORCESTER, MASSACHUSETTS, A CORPORATION OF MASSACHUSETTS.

TOP-SCREW CAM FOR GILL DRAWING FRAMES.

Application filed May 7, 1923. Serial No. 637,055.

*To all whom it may concern:*

Be it known that we, CHARLES R. WILSON and CHARLES R. SCOTT, both citizens of the United States, said WILSON residing at Providence, in the county of Providence and State of Rhode Island, said SCOTT residing at Westboro, county of Worcester, and State of Massachusetts, have invented a new and useful Top-Screw Cam for Gill Drawing Frames, of which the following is a specification.

This invention relates to the application of the cam to the top screw of a drawing frame.

Heretofore these cams have been held on directly by a screw thread or by other fastening means that would not insure their exact location after wear and it is a matter of considerable skill on the part of the mechanics to place them in proper position and insure their being held there under all conditions.

The principal object of this invention is to provide a positive means for holding the cam in exact position on the screw and means for preventing its dislodgment endwise.

Reference is to be had to the accompanying drawings in which—

Figure 1:
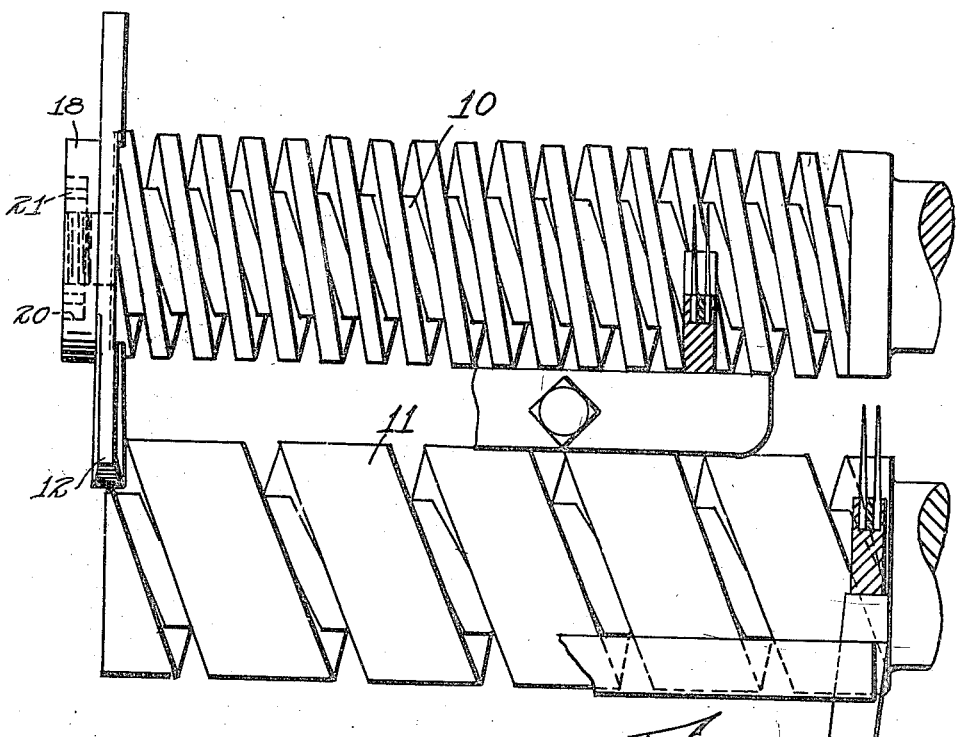
Fig. 1 is a side elevation of the top and bottom screws of a gill drawing frame showing the top cam provided with a preferred embodiment of this invention.
Figure 3:
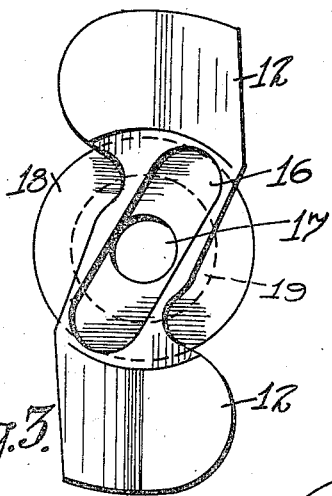
Fig. 3 is an end view of the cam itself removed from the screw.
Figure 2:
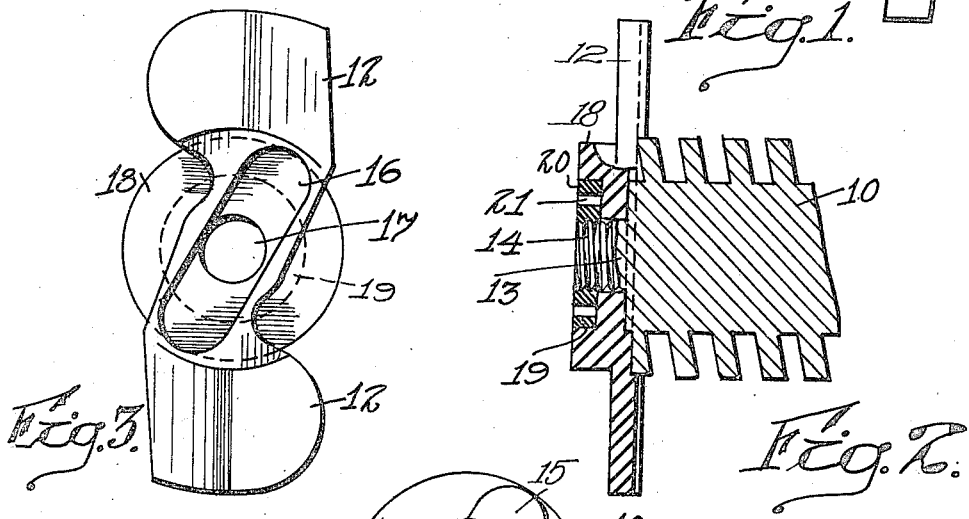
Fig. 2 is a central sectional view of the end of the top screw and cam.
Figure 4:
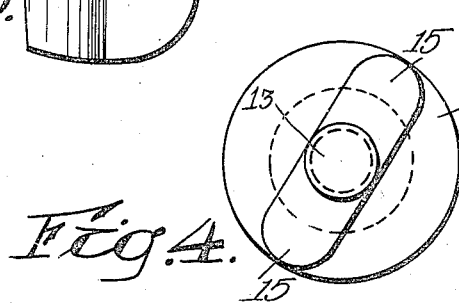
Fig. 4 is an end view of the screw with the cam and fastening means removed.

This invention relates to the top screw 10, although we have shown the bottom screw 11 associated therewith for the purpose of more fully illustrating the invention.

In order to secure the double cam 12 in position on the top screw in such a way that it cannot be placed incorrectly around the screw by an inexperienced operative and yet can be reversed end for end and provide effective and sure means for holding it against longitudinal displacement also, we have formed the end of the top screw 10 with a central stud 13 of cylindrical shape provided with a screw-thread 14 at its extremity. The threads of the two top screws of the set are opposite handed.

At the base of this stud there is a non-central projection 15. This is shown in the present case as being of a width equal to the diameter of the stud 13 and as projecting from it diametrically in opposite directions to the circumference of the screw. It projects from the extreme end of the double screw thread, with which the screw 10 is provided, a very short distance but it furnishes an anchor for entering a socket 16 of similar shape in the face of the cam 12. This cam of course is provided with a central perforation 17 for the stud 13 and is also provided with a hub 18 beyond the cam. This hub is provided with a cylindrical recess 19 in the outer face thereof.

It will be seen that the cam can be placed clear up against the end of the screw in only two positions. As the cam is alike on both ends it makes no difference in which one of these positions it is placed and it is impossible for an unskilled operator to place it incorrectly. This insures its proper position with respect to the screw at all times and insures it being positively held there.

In order to hold the cam against longitudinal disconnection from the stud we provide a nut 20 of such size as to fit within the recess 19 and provided with spanner holes 21 for use in tightening and loosening it. Its outer circumference is smooth and cylindrical and it is provided with a central perforation having a screw thread fitting the screw thread 14. Therefore, when the cam is properly placed in position the nut is screwed up and accurately holds it there. On account of the screw-thread being right or left-handed according to its direction of rotation and there is no danger of its becoming loosened by the ordinary operation of the machine.

Although we have illustrated and described only a single form of the invention, we are aware of the fact that modifications can be made therein by any person skilled in the art without departing from the scope of the invention as expressed in the claims. Therefore, we do not wish to be limited to all the details of construction herein shown and described, but what we do claim is:—

1. The combination with a top screw for a gill drawing frame having a threaded stud at the end and a non-circular projection at the base of said stud, of a top cam therefor having a perforation for the stud, and a non-concentric socket in one side of the cam for said projection having a similar shape, whereby when placed in position on the end of the screw the projection will fix the position of the cam and positively cause the cam to rotate with the screw, and means for fastening the cam on the stud.

2. In a gill drawing frame, the combination with a top screw having a stud at the end provided with a screw thread and having a pair of opposite projections at the base of said stud extending to the circumference of the screw at the end of its threads, a double cam therefor having a double socket for receiving said projections for locating the cam on the screw, said cam having a circular recess in its opposite face, and a locking nut having a size to fit in said recess and provided with a threaded passage therethrough for engagement with the stud and for securing the cam thereon.

3. The combination with a top screw for a gill drawing frame, having a central stud at the end and two opposite projections in a plane transverse to the axis of the screw and of a width substantially equal to the diameter of the stud and projecting in opposite directions therefrom substantially to the circumference of the screw, of a detachable double cam therefor having a double and diametral socket for receiving the projections, and means for fastening the cam on said stud.

4. In a gill drawing frame, the combination with a top screw having a stud at the end provided with a screw thread and having a projection extending therefrom near the base of the stud, of a double cam therefor having a socket located off center for receiving said projection and locating the cam on the screw, said cam having a recess in its opposite face and a locking nut in said recess for engagement with the stud to secure the cam thereon.

In testimony whereof we have hereunto affixed our signatures.

CHARLES R. WILSON.
CHARLES R. SCOTT.